Sept. 20, 1927.

R. L. WILLIS 1,642,982

COTTON GIN

Filed April 29, 1926

Inventor
RAY L. WILLIS

By Munn & Co.

Attorney

Sept. 20, 1927.　　　R. L. WILLIS　　　1,642,982
COTTON GIN
Filed April 29, 1926　　　2 Sheets-Sheet 2
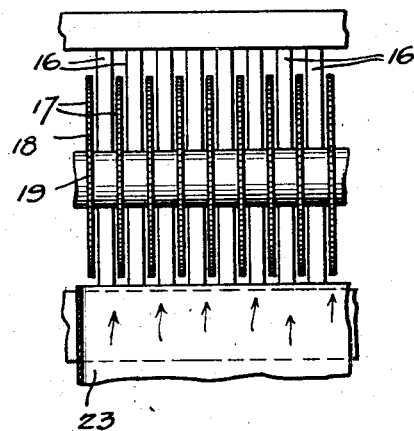
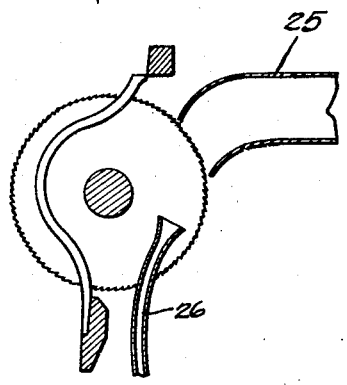
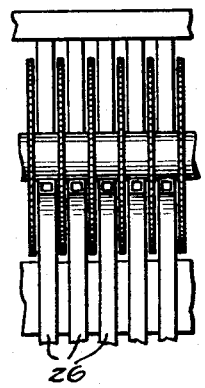
Inventor
RAY L. WILLIS
By Munn & Co.
Attorney Patented Sept. 20, 1927.

1,642,982

UNITED STATES PATENT OFFICE.

RAY L. WILLIS, OF ARVIN, CALIFORNIA.

COTTON GIN.

Application filed April 29, 1926. Serial No. 105,581.

My invention relates to pneumatic or brush gins of the character having saw blades which revolve to remove cotton from a hopper ribbed to separate the seeds, and an air nozzle or rotary brush for removing the lint from the blades and discharging the lint into a flue. In cotton gins of this character, the ribbed hopper, in its association with the saw blades, does not remove the mote and particles of dirt from the cotton, so that the cotton as finally delivered from the gin is contaminated.

It is a purpose of my invention to provide a cotton gin of the above described character having means for removing from the cotton mote and dirt and otherwise effectively cleaning the cotton. More specifically, my invention provides a single air nozzle or a plurality of air nozzles arranged to deliver jets of air to the cotton while on the saw blades and during its passage from the ribbed hopper to the lint removing nozzle, whereby the air is employed to remove mote and dirt from the cotton without removing the cotton from the saw blades so that the cleansed cotton can be finally removed in the usual manner.

I will describe only one form of cotton gin embodying my invention, and will then point out the novel features thereof in claims.

In the accompanying drawings,

Figure 2 is a sectional view taken on the line 2—2 of Figure 1;

Figure 3 is a fragmentary vertical sectional view showing a modified form of air nozzle in applied position to one of the saw blades of the gin and embodying my invention;

Figure 4 is a view showing in edge elevation a plurality of the air nozzles shown in Figure 3 associated with a plurality of saw blades.

Figure 1:
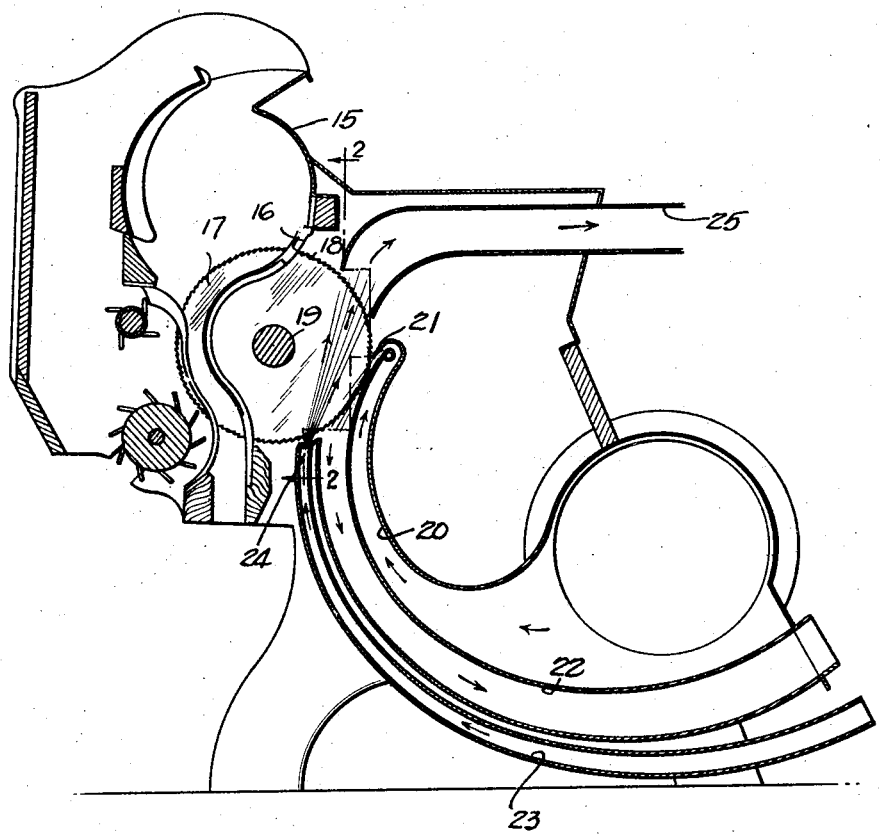
Figure 1 is a view showing in vertical transverse section one form of cotton gin embodying my invention.

Referring specifically to the drawings, in which similar reference characters refer to similar parts, the cotton gin shown in Figure 1 is of the conventional pneumatic type in that it includes a hopper 15 provided with ribs 16 between any two adjacent pairs of which is a saw blade 17 of disk form and having its edge provided with teeth 18 extending in a clockwise direction as when viewed in Figure 1. These saw blades 17 are all fixed to a common shaft 19, and the shaft is adapted to be driven in any suitable manner to effect continuous rotation of all of the blades in a clockwise direction so that the teeth thereof move in the direction in which they extend. An air channel 20 is arranged and constructed to provide an air nozzle 21 from which air is discharged tangentially with respect to the peripheries of the several blades 17 for the purpose of removing lint from the blades and discharging the same into a flue 22. The gin, of course, consists of other elements, but a description of these elements is not necessary to a clear understanding of my invention.

The subject matter of my invention comprises, as shown in Figures 1 and 2, an air channel 23 disposed below the lint flue 22 and substantially concentric therewith, its upper end terminating in an elongated nozzle 24 extending beneath and across the blade 17 and arranged to discharge air upwardly to opposite sides of the blades and outwardly across the teeth of the blades, and finally into a flue 25 arranged between the hopper 15 and the nozzle 21.

In the modification shown in Figures 3 and 4, I employ a plurality of air nozzles 26 with each nozzle interposed between any two adjacent blades and arranged to discharge jets of air upwardly into the flue 25 in the same manner as the common air nozzle 24.

In the operation of the cotton gin, the cotton which is dumped into the hopper 15 is engaged by the teeth 18 of the saw blades 17, and under the constant rotation of the blades the cotton is fed downwardly and outwardly of the hopper between the ribs 16, the latter serving to remove the seeds from the cotton while the cotton is retained on the blades by means of the teeth. As the cotton is carried forwardly and downwardly on the teeth of the blades, it moves into the path of upwardly moving air from the nozzle 24 or the nozzles 26, and under the action of the latter the mote and particles of dirt are blown from the cotton and discharged into the flue 25, the fibers of cotton remaining on the blades by virtue of the fact that the current of air from the nozzle moves in a direction opposed to the direction of movement of the saw teeth, and further because of the direction in which the saw teeth extend. Hence it will be seen that the cotton is carried downwardly on the teeth of the saw blades beyond the mouth of the flue 25, so as to be acted upon by the air emanating from the nozzle 21, which operates to remove the cotton from the saw blades. It will thus be seen that during transit of the cotton from the ribs to the air nozzle 21, the mote and dirt particles are removed from the cotton so that the latter as finally discharged into the flue 22 is clean.

Although I have herein shown and described only one form of cotton gin and two forms of air nozzles all embodying my invention, it is to be understood that various changes and modifications may be made therein without departing from the spirit of the invention and the spirit and scope of the appended claims.

I claim as my invention:

1. A cotton gin having rotary saw blades, the teeth of which extend in the direction of rotation of the blades, and pneumatic means for cleansing the seed cotton while on the blades and without removing the cotton therefrom, whereby the cotton will be cleaned during the ginning thereof.

2. A cotton gin having a ribbed hopper, an air nozzle spaced from the hopper, revolving saw blades for transferring seed cotton on the teeth thereof from the hopper to the air nozzle, and means for cleansing the cotton during transit from the hopper to the air nozzle, whereby the cotton will be cleaned while being ginned.

3. A cotton gin having a ribbed hopper, an air nozzle spaced from the hopper, revolving saw blades for transferring cotton on the teeth thereof from the hopper to the air nozzle, and an air nozzle for directing jets of air in a direction opposed to the direction of rotation of the saw blades and in a manner to cleanse the seed cotton during transit from the hopper to the first air nozzle, whereby the cotton will be cleaned during the ginning thereof.

4. A cotton gin having rotary saw blades, the teeth of which extend in the direction of rotation of the blades, and means for cleansing the seed cotton while on the blades and without removing the cotton therefrom, whereby the cotton will be cleaned during the ginning thereof.

5. As an article of manufacture, an air nozzle adapted to be associated with the rotary saw blades of a cotton gin to discharge jets of air in a direction opposed to the direction of rotation of the blades and against the teeth thereof to cleanse the seed cotton while on the blades, whereby the cotton will be cleaned during the ginning thereof.

RAY L. WILLIS.